No. 811,916. PATENTED FEB. 6, 1906.
L. A. HALL.
NUT LOCK.
APPLICATION FILED APR. 4, 1905.
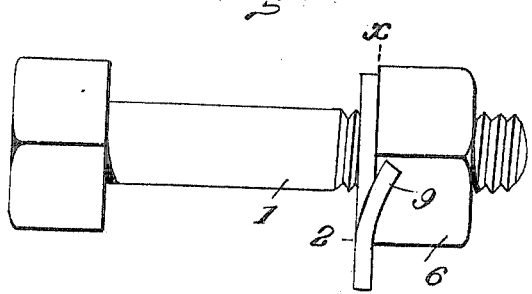
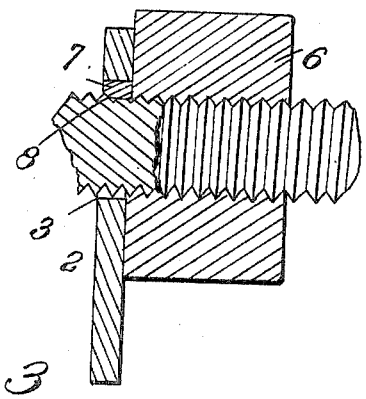
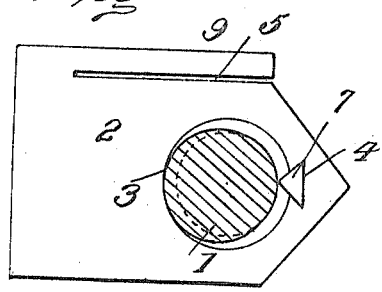
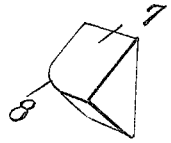
Witnesses
Chas. Norris.
Inventor
L. A. Hall,
By R. S. & A. B. Lacey, Attorneys

UNITED STATES PATENT OFFICE.

LEMUEL A. HALL, OF CHRISTIANA, PENNSYLVANIA.

NUT-LOCK.

No. 811,916.     Specification of Letters Patent.     Patented Feb. 6, 1906.

Application filed April 4, 1905. Serial No. 253,840.

*To all whom it may concern:*

Be it known that I, LEMUEL A. HALL, a citizen of the United States, residing at Christiana, in the county of Lancaster and State of Pennsylvania, have invented certain new and useful Improvements in Nut-Locks, of which the following is a specification.

This invention relates to nut-locks, and more particularly to that type in which the nut is locked to a washer and the washer in turn locked to the bolt.

It has for its object to produce a device of the character mentioned which shall be simple in construction, cheap to manufacture, and extremely effective in operation.

For a full description of the invention and the merits thereof and also to acquire a knowledge of the details of construction of the means for effecting the result reference is to be had to the following description and accompanying drawings, in which—

Figure 1 is a side view of a bolt with my nut-lock attached thereto. Fig. 2 is a horizontal section through the washer. Fig. 3 is a sectional view on the line $x\,x$ of Fig. 1. Fig. 4 is a perspective view of the locking-key.

Corresponding and like parts are referred to in the following description and indicated in all the views of the drawings by the same reference characters.

The numeral 1 indicates the bolt, which may be of the ordinary type, as shown. A washer 2 is provided, having an opening 3 therein of a size adapted to fit over the bolt. A dovetail-shaped recess 4 is provided at one side of the opening 3. The washer 2 is preferably formed with at least one straight side and with a slit 5, which runs from one side parallel to said straight side and extends almost to the opposite side. This slit 5 is at such a distance from the opening 3 that when the tongue 9 thus formed is bent up, as shown in Fig. 1, it engages with an edge or side face of the nut 6 and locks it in position. A wedge-shaped dog or lock member 7 is employed to secure the washer to the threads of the bolt. This wedge-shaped member is approximately a triangular prism, the lower portion of the biting edge of which is leveled off, as shown at 8 in Fig. 4. This beveled edge 8 enables the member 7 to be easily placed in position. In use the washer 2 is placed over the bolt end, the wedge-shaped member 7 placed in position so that two of its edges are engaged by the dovetail recess 4, and the nut 6 screwed down. This forces the locking member 7 down, so that its biting edge engages with the threads of the bolt, and thus prevents the washer from turning. When the nut has been screwed down into position, it is turned so that one side is adjacent the slit 5. The tongue 9, formed by said slit, is then turned up so as to embrace the nut 6, and the nut is thereby locked in position. From the foregoing it will be understood that I have produced a nut-lock which, owing to its simplicity and great efficiency, is adapted to universal use.

Having thus described the invention, what is claimed as new, and desired to be secured by Letters Patent, is—

1. A nut-lock comprising a bolt, a nut cooperating therewith, a washer having a tongue adapted to be bent up into engagement with said nut in order to prevent any relative turning thereof, and a separable locking member fitting in a recess in the washer having communication with the bolt-receiving opening therein, and adapted to bite into the threads of the bolt to prevent any turning of the washer thereon.

2. In a nut-lock, the combination of a bolt, a nut, a washer having a dovetail recess in communication with the opening therein, and also having a locking-tongue adapted to be bent up into engagement with an edge of said nut, and a locking member of approximately triangular form in cross-section and adapted to fit in the aforementioned dovetail recess and to bite into the threads of said bolt.

3. In a nut-lock, the combination of a bolt, a nut, a washer having a dovetail recess in communication with the opening therein, and also having a locking-tongue adapted to be bent up into engagement with an edge of said nut, and a locking member of approximately triangular form in cross-section and adapted to fit in the aforementioned dovetail recess and bite into the threads of the bolt, the biting edge of said locking member being beveled off to admit of its being easily placed in position and of its ready advancement under action of the nut.

In testimony whereof I affix my signature in presence of two witnesses.

LEMUEL A. HALL. [L. S.]

Witnesses:
   NORA H. HARRAR,
   J. A. HARRAR.